(12) United States Patent
Cho

(10) Patent No.: US 12,355,124 B2
(45) Date of Patent: Jul. 8, 2025

(54) UNITIZED REGENERATIVE FUEL CELL SYSTEM FOR TUNNEL AND METHOD FOR CONTROLLING THE SAME

(71) Applicants: HYUNDAI MOTOR COMPANY, Seoul (KR); KIA CORPORATION, Seoul (KR)

(72) Inventor: Min Kyung Cho, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 260 days.

(21) Appl. No.: 17/875,695

(22) Filed: Jul. 28, 2022

(65) Prior Publication Data

US 2023/0037065 A1   Feb. 2, 2023

(30) Foreign Application Priority Data

Aug. 2, 2021   (KR) .................. 10-2021-0101395

(51) Int. Cl.
| | |
|---|---|
| H01M 8/18 | (2006.01) |
| C25B 1/04 | (2021.01) |
| H01M 8/04082 | (2016.01) |
| H01M 8/04089 | (2016.01) |
| H01M 8/04291 | (2016.01) |
| H01M 8/0444 | (2016.01) |

(Continued)

(52) U.S. Cl.
CPC ............... *H01M 8/184* (2013.01); *C25B 1/04* (2013.01); *H01M 8/04089* (2013.01); *H01M 8/04201* (2013.01); *H01M 8/04291* (2013.01); *H01M 8/04455* (2013.01); *H01M 8/04686* (2013.01); *H01M 8/04753* (2013.01); *H01M 2250/10* (2013.01)

(58) Field of Classification Search
CPC ............ H01M 8/184; H01M 8/04089; H01M 8/04201; H01M 8/04291; H01M 8/04455; H01M 8/04686; H01M 8/04753; H01M 2250/10; H01M 8/04313; H01M 8/0444; H01M 8/04492; H01M 8/04664; H01M 8/04746; H01M 8/188; H01M 8/186; H01M 2008/1095; C25B 1/04; Y02E 60/50; A62C 3/0221; G05B 17/00
USPC .......................................................... 429/463
See application file for complete search history.

(56) References Cited

U.S. PATENT DOCUMENTS

| 7,410,714 B1 * | 8/2008 | Burke | ............... H01M 8/04126 |
| | | | 429/418 |
| 2004/0013918 A1 * | 1/2004 | Merida-Donis | ........... C25B 1/04 |
| | | | 429/444 |

(Continued)

FOREIGN PATENT DOCUMENTS

| KR | 2006-0102192 A | 9/2006 |
| KR | 10-2260935 B1 | 6/2021 |

*Primary Examiner* — Christian Roldan
(74) *Attorney, Agent, or Firm* — MCDONNELL BOEHNEN HULBERT & BERGHOFF LLP

(57) ABSTRACT

Disclosed is a unitized regenerative fuel cell system, comprised of a unitized regenerative fuel cell able to operate in a fuel cell mode for electric power generation and in a water electrolysis mode for hydrogen and oxygen production, and a plurality of fire-detecting sensors for detecting fire in each zone of a tunnel, and configured to supply oxygen to zones wherein fire has not occurred if occurrence of fire has been detected in a tunnel, and a method for controlling the same.

14 Claims, 7 Drawing Sheets

(51) Int. Cl.
*H01M 8/04664* (2016.01)
*H01M 8/04746* (2016.01)

(56) References Cited

U.S. PATENT DOCUMENTS

| | | | |
|---|---|---|---|
| 2019/0260056 A1* | 8/2019 | Yachi | H01M 8/04164 |
| 2021/0066741 A1* | 3/2021 | Park | H01M 4/9016 |

* cited by examiner

UNITIZED REGENERATIVE FUEL CELL SYSTEM FOR TUNNEL AND METHOD FOR CONTROLLING THE SAME

CROSS REFERENCE TO RELATED APPLICATIONS

The present application claims priority to Korean Patent Application No. 10-2021-0101395, filed Aug. 2, 2021, the entire contents of which is incorporated herein for all purposes by this reference.

BACKGROUND

Field

The present disclosure relates to a unitized regenerative fuel cell system able to produce hydrogen and oxygen through water electrolysis, and use water to produce electric energy, and a method for controlling the same. More specifically, the present disclosure relates to a unitized regenerative fuel system which can be installed in a tunnel, and a method for controlling the same.

Description of the Related Art

In the case of roads installed in mountainous terrain, it is common practice to build tunnels through mountains to reduce the overall length of the road and reduce construction costs. Whereas there are short tunnels which are only several tens of meters in length, there are also tunnels which extend for several hundreds of meters.

Meanwhile, fires pose a risk of large loss of life in such tunnels. For example, in a case where a fire occurs inside a tunnel due to an accident such as vehicle collision, the structure of the tunnel, which is completely blocked with the exception of the entrance and exit, causes the inside to quickly fill up with toxic gases. If a fire occurs in the middle of a long tunnel having a length of hundreds of meters, a substantial amount of time would be required for the passengers and drivers of the vehicles in the tunnel to evacuate away from the toxic gases. As it is possible that a fire occurring inside a tunnel could lead to huge loss of life, facilities to combat such in-tunnel fires are necessary.

Therefore facilities which are able to identify a zone wherein a fire has occurred and supply oxygen to zones in the tunnel wherein the fire has not directly occurred are required.

The matters described in the above are intended solely to further understanding as to the background of the present disclosure, and shall not be construed as admitting that the present disclosure corresponds to prior art already known to persons having ordinary skill in the art.

SUMMARY

The purpose of the present disclosure, proposed to solve the above-stated problems, is to provide a unitized regenerative fuel cell system for a tunnel which uses a unitized regenerative fuel cell system capable of electricity general and hydrogen and oxygen production to alternatingly carry out electricity generation and oxygen and hydrogen production in a tunnel, and which is able to provide sufficient oxygen into a tunnel to prevent drops in oxygen concentrations in the event of fire, and a method for controlling the same.

Another purpose of the present disclosure is to provide, for the adoption of a unitized regenerative fuel cell system in anticipation of an in-tunnel fire, a method for controlling a unitized regenerative fuel cell system for a tunnel which improves system efficiency and allows stable system operation.

Yet another purpose of the present disclosure is to provide a system control method able to effectively supply oxygen to greatly reduce loss of life in the event of fire.

The unitized regenerative fuel cell system for tunnel according to one embodiment of the present disclosure, to achieve the above-stated purposes, is comprised of a unitized regenerative fuel cell able to operate in a fuel cell mode for electric power generation and in a water electrolysis mode for hydrogen and oxygen production, an oxygen storage unit for storing oxygen produced when the unitized regenerative fuel cell operates in water electrolysis mode, an oxygen feed line connected to the oxygen storage unit; \, a plurality of oxygen feeders for supplying, from the oxygen feed line, oxygen to a plurality of predetermined zones within the tunnel, a plurality of feeder valves able to cut off oxygen supply to the oxygen feeders, and, a plurality of fire-detecting sensors for detecting fire in each zone of the tunnel, and is configured to, when a fire in the tunnel is detected by the fire-detecting sensors, open the feeder valves to supply oxygen to zones where the fire has not occurred.

The respective oxygen feeders may be designated for zones within the tunnel assigned to the fire-detecting sensors, and the feeder valve for the oxygen feeder designated for a zone in the tunnel in which a fire has been detected may be closed so that oxygen is not fed thereto.

In a case that the oxygen stored in the oxygen storage unit is at or below a preset reference level, the unitized regenerative fuel cell may be operated in water electrolysis mode to produce oxygen.

A plurality of oxygen concentration sensors installed for a plurality of zones preassigned to the plurality of oxygen feeders to measure the oxygen concentration of each zone may be further comprised, and the oxygen concentration sensors may be controlled to measure the oxygen concentration of each zone, and, if the measured oxygen concentration is equal to or less than a reference concentration, to open a feeder valve to supply oxygen into sections within the tunnel where a fire has not occurred.

A power supply for supplying electric power to the unitized regenerative fuel cell and electrically powered facilities within the tunnel, and a hydrogen storage unit for storing hydrogen produced by the unitized regenerative fuel cell may be further comprised, and the unitized regenerative fuel cell may operate in water electrolysis mode powered by electricity from the power supply, and when an anomaly of the power supply is detected, the unitized regenerative fuel cell may receive hydrogen from the hydrogen storage unit to operate in fuel cell mode to provide emergency power to electrically powered facilities within the tunnel.

The system may be configured to check, when an anomaly of the power supply is detected, whether or not the fire-detecting sensors have detected a fire, and, if a fire has not been detected by the fire-detecting sensors, supply the oxygen stored in the oxygen storage unit to the unitized regenerative fuel cell, and, if a fire has been detected by the fire-detecting sensors, supply outside air to the unitized regenerative fuel cell.

A water storage unit for storing water to be supplied to the unitized regenerative fuel cell may be further comprised, configured to check the amount of hydrogen stored in the hydrogen storage unit and the amount of water stored in the water storage unit if an anomaly of the power supply has not been detected, and to, in a case where the amount of hydrogen stored is less than a maximum level and the amount of water stored exceeds a reference level, operate the unitized regenerative fuel cell in water electrolysis mode to produce hydrogen and oxygen.

Further, the unitized regenerative fuel cell system for tunnel according to another embodiment of the present disclosure may be comprised of a unitized regenerative fuel cell able to operate in a fuel cell mode for power generation and in a water electrolysis mode for hydrogen and oxygen production, a power supply for supplying electric power to the unitized regenerative fuel cell and electrically powered facilities within the tunnel, and, a hydrogen storage unit for storing hydrogen produced when the unitized regenerative fuel cell operates in water electrolysis mode, and the unitized regenerative fuel cell may receive power from the power supply to operate in water electrolysis mode, and when an anomaly of the power supply is detected, the unitized regenerative fuel cell may receive hydrogen from the hydrogen storage unit to operate in fuel cell mode to supply emergency power to electrically powered facilities in the tunnel.

Further, the method for controlling a unitized regenerative fuel cell system for tunnel according to one embodiment of the present disclosure is comprised of detecting a fire in a tunnel using fire-detecting sensors, and, supplying oxygen to zones wherein a fire has not occurred by means of oxygen feeders if a fire has been detected in the tunnel.

The respective oxygen feeders may be assigned to zones in the tunnel assigned to fire-detecting sensors, and in supplying oxygen, may supply oxygen into the tunnel through the oxygen feeders assigned to the tunnel zones other than the zone in which fire has been detected, and block oxygen supply from the oxygen feeders assigned for the zone of the tunnel where fire has been detected.

In a case where a fire has been detected in detecting a fire, the method may further comprise checking oxygen storage level in an oxygen storage unit prior to supplying oxygen, and in a case where the oxygen stored in the oxygen storage unit is found to be equal to or less than a preset reference level, the unitized regenerative fuel cell may be operated in water electrolysis mode to produce oxygen.

The method may, after checking oxygen storage level and prior to supplying oxygen, further comprise measuring oxygen concentration in each zone using a plurality of oxygen concentration sensors installed in each of a plurality of zones assigned beforehand to the plurality of oxygen feeders, and in supplying oxygen, oxygen may be supplied to zones wherein the measured oxygen concentration is less than a reference concentration.

Further, the method for controlling a unitized regenerative fuel cell system for tunnel according to another embodiment of the present disclosure is comprised of: detecting anomalies in supply of electric power from the power supply to electrically powered facilities in the tunnel; and, supplying emergency power to electrically powered facilities in the tunnel by operating the unitized regenerative fuel cell in fuel cell mode if a power supply anomaly is detected.

The method may further comprise, after detecting anomalies in electric power supply and before supplying emergency power, detecting fire in the tunnel by means of fire-detecting sensors, and, if a fire has not been detected by the fire-detecting sensors, the oxygen stored in the oxygen storage unit may be supplied to the unitized regenerative fuel cell, and, if a fire has been detected by the fire-detecting sensors, outside air may be supplied to the unitized regenerative fuel cell.

In a case where, in detecting anomalies in electric power supply, no electric power supply anomaly has been detected, checking the amount of hydrogen stored in the hydrogen storage unit and the amount of water stored in the water storage unit if an anomaly of electric power supply has not been detected; and, operating the unitized regenerative fuel cell in water electrolysis mode to produce hydrogen and oxygen in a case where the amount of hydrogen stored is less than a maximum level and the amount of water stored exceeds a reference level.

According to the unitized regenerative fuel cell system for tunnel and method for controlling the same of the present disclosure, the oxygen generated when producing hydrogen using the water electrolysis device of a unitized regenerative fuel cell system can be used to alleviate shortage of oxygen within a confined space.

Further, according to the unitized regenerative fuel cell system for tunnel and method for controlling the same of the present disclosure, it is possible to generate environmentally friendly energy using a unitized regenerative fuel cell system within a tunnel.

Further, according to the present disclosure, adoption of a water electrolysis device increases power generation time and produces highly pure hydrogen to improve system efficiency.

DETAILED DESCRIPTION

In the following, the unitized regenerative fuel cell system for tunnel and method for controlling the same according to various embodiments of the present disclosure will be described in detail with reference to the attached drawings.

Figure 1:
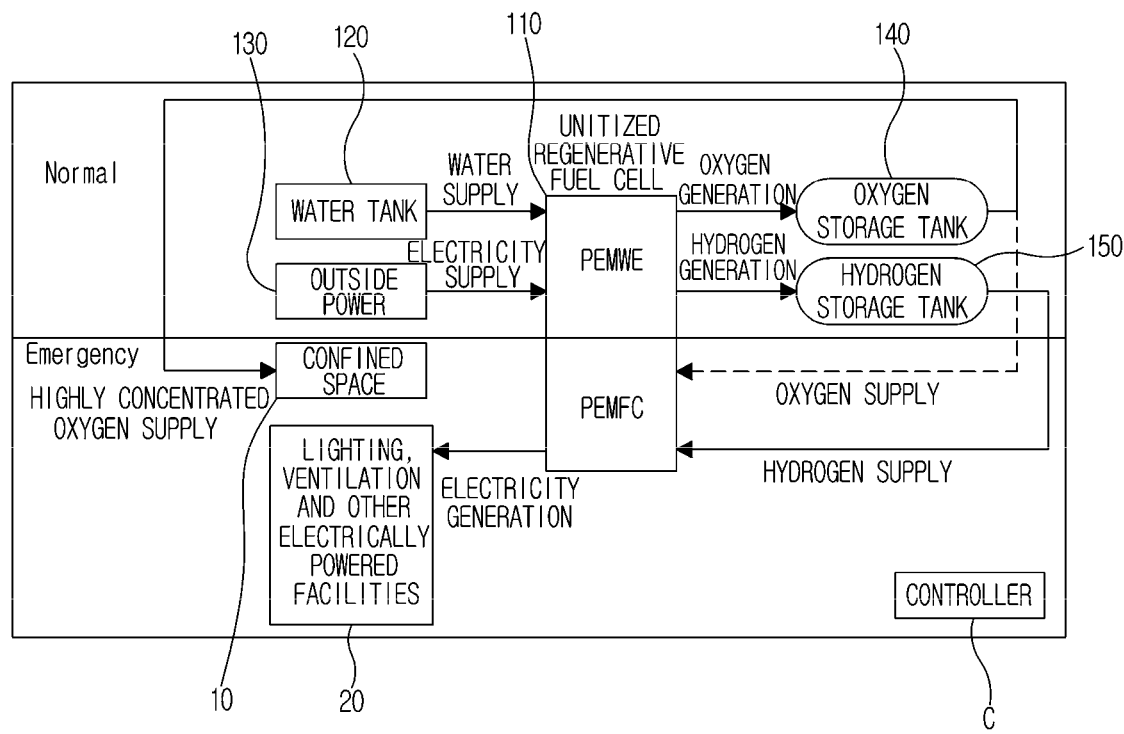
FIG. 1 is a schematic diagram roughly illustrating the configuration and operation of the unitized regenerative fuel cell system for tunnel according to one embodiment of the present disclosure.

FIG. 1 is a schematic diagram roughly illustrating the configuration and operation of the unitized regenerative fuel cell system for tunnel according to one embodiment of the present disclosure.

As illustrated in FIG. 1, the unitized regenerative fuel cell system for tunnel according to one embodiment of the present disclosure includes a unitized regenerative fuel cell able to operate in a fuel cell mode for electric power generation and in a water electrolysis mode for hydrogen and oxygen production.

In the present disclosure, unitized regenerative fuel cell (URFC) refers to a system wherein two separate systems, a fuel cell and a water electrolysis device, have been integrated into a single unitized regenerative fuel cell (URFC) system. Initially, the system may be operated in a water electrolysis mode wherein water stored in a water tank is supplied to the unitized regenerative fuel cell and external power is supplied to induce electrolysis of the water to generate hydrogen and oxygen, with the generated hydrogen and oxygen stored in tanks.

On the other hand, in a fuel cell mode, the system operates identically to a conventional fuel cell, as a system that generates electric energy through oxidation and reduction reactions of hydrogen and oxygen. Here, the hydrogen and oxygen generated in water electrolysis mode may be utilized. That is, the unitized regenerative fuel cell 110 may obtain electric energy by feeding regenerated hydrogen and oxygen back into the fuel cell. Accordingly, the utility of the unitized regenerative fuel cell can be multiplied by using regenerative energy-generating devices such as solar power, wind power, tidal power and geothermal as the external power source.

Further, such unitized regenerative fuel cell 110 may use a polymer electrolyte membrane, and in the present specification, for convenience of description, a unitized regenerative fuel cell 110 operating in a fuel cell mode will be indicated as a polymer electrolyte membrane fuel cell (PEMFC), and a unitized regenerative fuel cell operating in a water electrolysis mode will be indicated as a polymer electrolyte membrane water electrolysis device (PEMWE).

Figure 2:
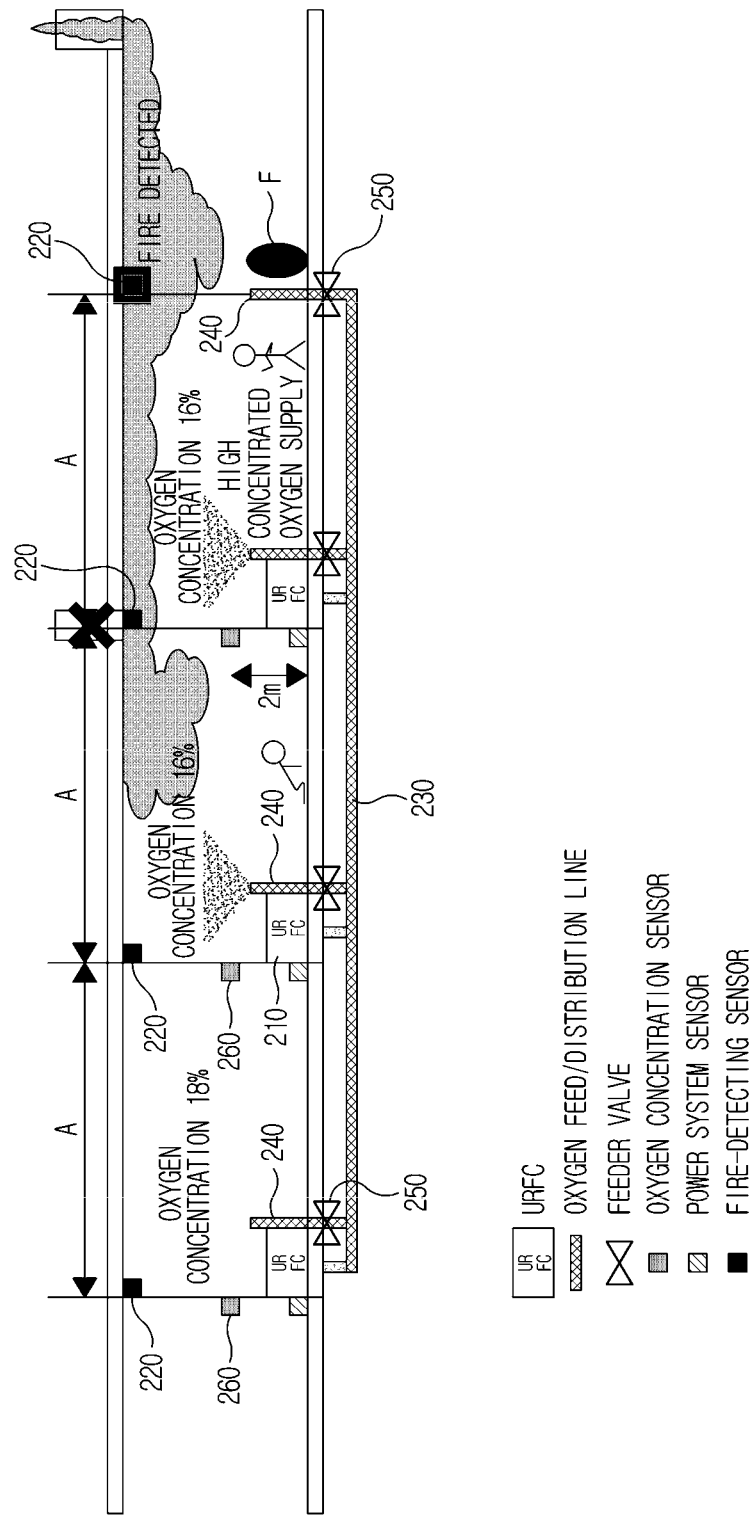
FIG. 2 is a conceptual diagram of an example wherein the unitized regenerative fuel cell system for tunnel according to one embodiment of the present disclosure detects a fire in a tunnel and supplies oxygen.

Such unitized regenerative fuel cell 110 may be installed inside a tunnel, and may preferably be installed at predetermined intervals A within the tunnel (shown in FIG. 2). Also, the unitized regenerative fuel cell 110 may be installed outside a tunnel, but preferably in such a case is configured to be able to supply generated electric power and oxygen into the tunnel.

In the present disclosure, unitized regenerative fuel cell 110 refers to a device which can operate in both such fuel cell mode and water electrolysis mode. As specific elements relating to a unitized regenerative fuel cell are already known to the art, detailed description thereof will be omitted in the present specification.

Further, the unitized regenerative fuel cell system for tunnel according to the present disclosure may include a controller C to control the internal elements of the system, and the controller C, as illustrated in FIG. 1, may control the operation of the unitized regenerative fuel cell 110 and also the supply of electric power and byproducts such as water, electricity, oxygen and hydrogen generated within the system.

Referring to FIG. 1, the unitized regenerative fuel cell system according to the present disclosure includes a power supply 130 which is linked to a unitized regenerative fuel cell 110 to supply external power. The power supply 130 may be a regenerative power generating device such as solar, wind, tidal or geothermal, and may also be a device able to supply electric power from a different power source to the unitized regenerative fuel cell 110.

Meanwhile, the power supply 130 does not only supply electric power to the unitized regenerative fuel cell, and may be configured to supply electric power to various electrically powered facilities 20 that consume electricity installed in the tunnel, such as lighting and ventilation.

Further, the unitized regenerative fuel cell system for tunnel may include a water storage unit 120 such as a water tank for supplying water to the unitized regenerative fuel cell. Water produced in a fuel cell mode of the unitized regenerative fuel cell may be stored in such water storage unit 120. Further, the water stored in the water storage unit 120 may be supplied to the unitized regenerative fuel cell in a water electrolysis mode.

Further, the unitized regenerative fuel cell system for tunnel may include storage units such as an oxygen storage tank and hydrogen storage tank for storing hydrogen and oxygen generated in a water electrolysis mode. As seen in FIG. 1, the oxygen and hydrogen generated from the unitized regenerative fuel cell in a water electrolysis mode may be stored respectively in an oxygen storage unit 140 and a hydrogen storage unit 150. Meanwhile, the stored oxygen and hydrogen may, in a case where the unitized regenerative fuel cell is operating in a fuel cell mode, be fed back into the unitized regenerative fuel cell.

Further, the oxygen stored in the oxygen storage unit may be fed back into a confined space 10 in the tunnel. For example, in a case where a fire has occurred in the tunnel, the system may be configured to supply the oxygen stored in the oxygen storage unit to a zone of the tunnel in which the fire has not occurred. By supplying highly concentrated oxygen into the tunnel, it is possible to prevent loss of life due to low oxygen concentrations in the tunnel.

Further, the unitized regenerative fuel cell system for tunnel may include a power system sensor which detects anomalies in electric power supply from the power supply 130, and anomalies in the power system may be detected using such power system sensor. Also, the unitized regenerative fuel cell may be linked with electrically powered facilities 20 in the tunnel so as to supply electric power generated in a fuel cell mode to various electricity-consuming electrically powered facilities 20 in the tunnel, such as lighting and ventilation.

Accordingly, in a case where a power system anomaly has been detected through the power system sensor, the unitized regenerative fuel cell may be controlled to operate in a fuel cell mode, and the electric power generated thereby may be controlled to be supplied to electrically powered facilities within the tunnel.

FIG. 2 is a conceptual diagram of an example wherein the unitized regenerative fuel cell system for tunnel according to one embodiment of the present disclosure detects a fire in a tunnel and supplies oxygen.

In particular, FIG. 2 is an example configured so that the interior of a tunnel is divided into a plurality of zones, with a sensor, unitized regenerative fuel cell 210 and an oxygen feeder 240 installed in each zone. Here, the zones into which [the tunnel] is divided as in FIG. 2 may be established at constant intervals A. Further, in the example of FIG. 2, the respective elements, in particular a fire-detecting sensor 220, oxygen concentration sensor 260, unitized regenerative fuel cell 210 and oxygen feeder 240 are shown installed within a zone at constant intervals. However, the position and intervals of installation of the respective elements is not limited to those illustrated, and the positions and intervals may be adjusted so long as the respective elements can be assigned to zones into which the tunnel is divided. Note that FIG. 1 is an example to explain the functional aspect of the unitized regenerative fuel cell, and FIG. 2 is an example to explain the actual installation of a unitized regenerative fuel cell inside a tunnel. Different reference numerals are used for the unitized regenerative fuel cell depending on the example.

As shown in FIG. 2, each zone may be installed with an oxygen concentration sensor 260 to measure oxygen concentration, a power system sensor for detecting anomalies in electric power supply, and a fire-detecting sensor 220 for detecting occurrence of fire.

Further, an oxygen feed line 230 connected to an oxygen storage unit in which oxygen generated by the unitized regenerative fuel cell 210 is stored, and the oxygen feed line may be connected to the respective zones of the tunnel. Installed on the oxygen feed line 230 may be a plurality of oxygen feeders 240, and the plurality of oxygen feeders may be exposed at each of the zones into which the tunnel is divided. The oxygen feeders 240 may be comprised of branching pipes and spray nozzles to spray the oxygen fed through the oxygen feed line 230 into the tunnel.

Further, a plurality of feeder valves 250 able to cut off oxygen supply may be installed on each of the branching pipes.

In FIG. 2, an example wherein a fire has occurred in the rightmost of the zones shown is illustrated. If oxygen is supplied through the oxygen feeder in a zone where fire has been detected, the fire may spread. Accordingly, in the case of a zone where a fire has been detected, the feeder valve 250 is controlled to remain closed to prevent supply of oxygen into the zone where fire has been detected.

On the other hand, in zones where occurrence of fire has not been detected, highly concentrated oxygen may be supplied to address the problem of decreasing oxygen concentration in the event of fire.

Preferably, oxygen supply may be carried out depending on the oxygen concentration detected in a given zone. In the example of FIG. 2, oxygen is being supplied into two zones where the oxygen concentration has been measured to be 16%. Unlike this case, in a case where oxygen concentration is found to be 18%, it may be judged that sufficient oxygen exists, and oxygen supply may be cut off.

Figure 3:
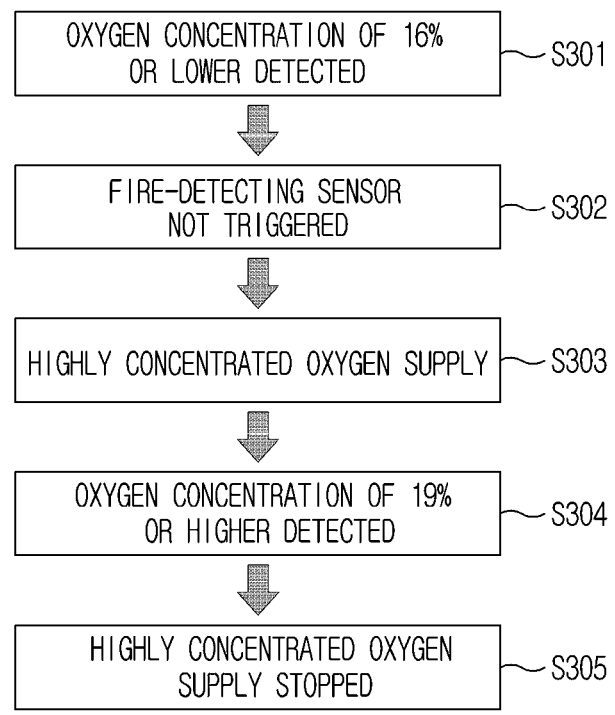
FIG. 3 is a flowchart illustrating an example of control in the method for controlling a unitized regenerative fuel cell system for tunnel according to one embodiment of the present disclosure in a case where there is insufficient oxygen in a zone where a fire has not occurred.

FIG. 3 is a flowchart illustrating an example of control in the method for controlling a unitized regenerative fuel cell system for tunnel according to one embodiment of the present disclosure in a case where there is insufficient oxygen in a zone where a fire has not occurred.

The example of FIG. 3 is an example wherein the reference level of oxygen concentration for supplying oxygen into the tunnel during a fire has been set to 16%. The oxygen concentration sensors detect the oxygen concentration of each zone and identifies zones where the oxygen concentration is 16% or less at S301. If a given zone is a zone wherein occurrence of fire has not been detected by a fire-detecting sensor at S302, highly concentrated oxygen is supplied through the oxygen feeder at S303. Thereafter, whether or not the oxygen concentration has reached an upper limit (for example, 19%), set for halting oxygen supply is checked at S304, and if the upper limit has been reached, the supply of highly concentrated oxygen may be halted at S305.

Accordingly, in zones of the tunnel where fire has not occurred, oxygen concentration between a lower limit (16%) and an upper limit (19%) may be maintained.

Figure 4:
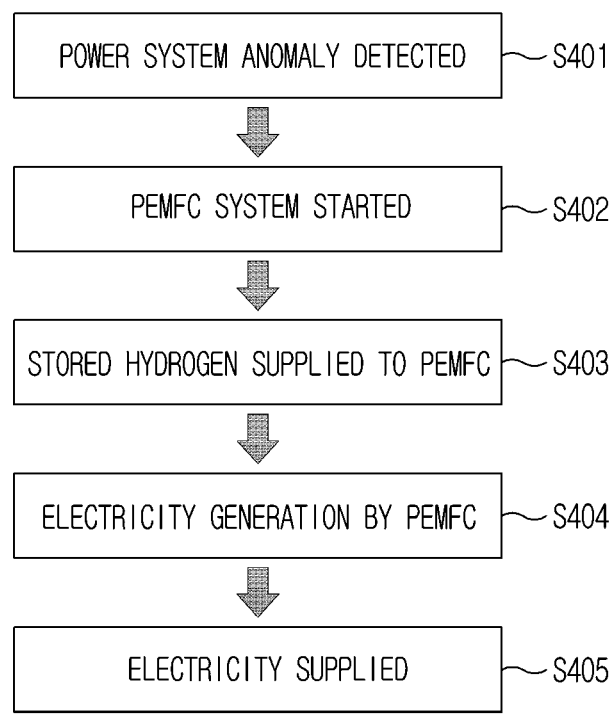
FIG. 4 is a flowchart illustrating an example of control in the method for controlling a unitized regenerative fuel cell system for tunnel according to one embodiment of the present disclosure in a case where an anomaly has occurred in the power system.

Meanwhile, FIG. 4 is a flowchart illustrating an example of control in the method for controlling a unitized regenerative fuel cell system for tunnel according to one embodiment of the present disclosure in a case where an anomaly has occurred in the power system.

As illustrated in FIG. 4, in a case where a power system anomaly such as abnormal supply of electric power has been detected by a power system sensor at S401, the controller operates the unitized regenerative fuel cell in a fuel cell mode at S402. Accordingly, the controller supplies the hydrogen stored in a hydrogen storage unit at S403, and electric energy is generated in a fuel cell mode at S404. Here, as described in the foregoing, the oxygen supplied to the unitized regenerative fuel cell may be supplied from outside or from an oxygen storage unit 140.

In this case, where electric power is not being supplied normally from the power supply, the electric energy generated may be supplied to electrically powered facilities in the tunnel at S405.

Figure 5:
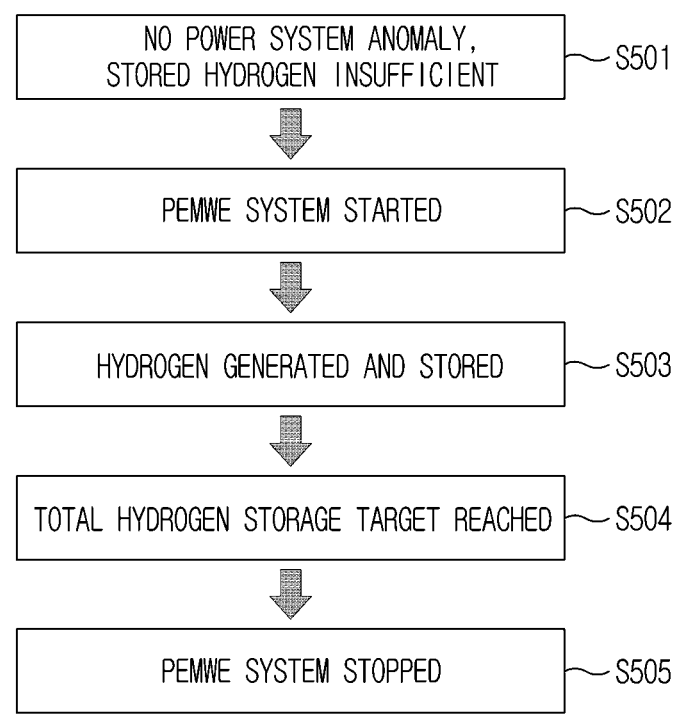
FIG. 5 is a flowchart illustrating an example of control in the method for controlling a unitized regenerative fuel cell system for tunnel according to one embodiment of the present disclosure in a case where no anomaly has occurred in the power system but there is insufficient stored hydrogen.

On the other hand, FIG. 5 is a flowchart illustrating an example of control in the method for controlling a unitized regenerative fuel cell system for tunnel according to one embodiment of the present disclosure in a case where no anomaly has occurred in the power system but there is insufficient stored hydrogen.

As illustrated in FIG. 5, in a case where there is no power system anomaly but there is insufficient stored hydrogen at S501, it is necessary to charge hydrogen for use in emergency. Accordingly, in such a case, the controller may operate the unitized regenerative fuel cell in a water electrolysis mode at S502, and the hydrogen generated by the unitized regenerative fuel cell may be stored in a hydrogen storage unit at S503. Meanwhile, in a case where the total amount of hydrogen stored has reached a target (the maximum allowed storage capacity of the hydrogen storage tank, for example, 5 kg) at S504, the water electrolysis mode operation of the unitized regenerative fuel cell may be halted to stop hydrogen production at S505.

Figure 6:
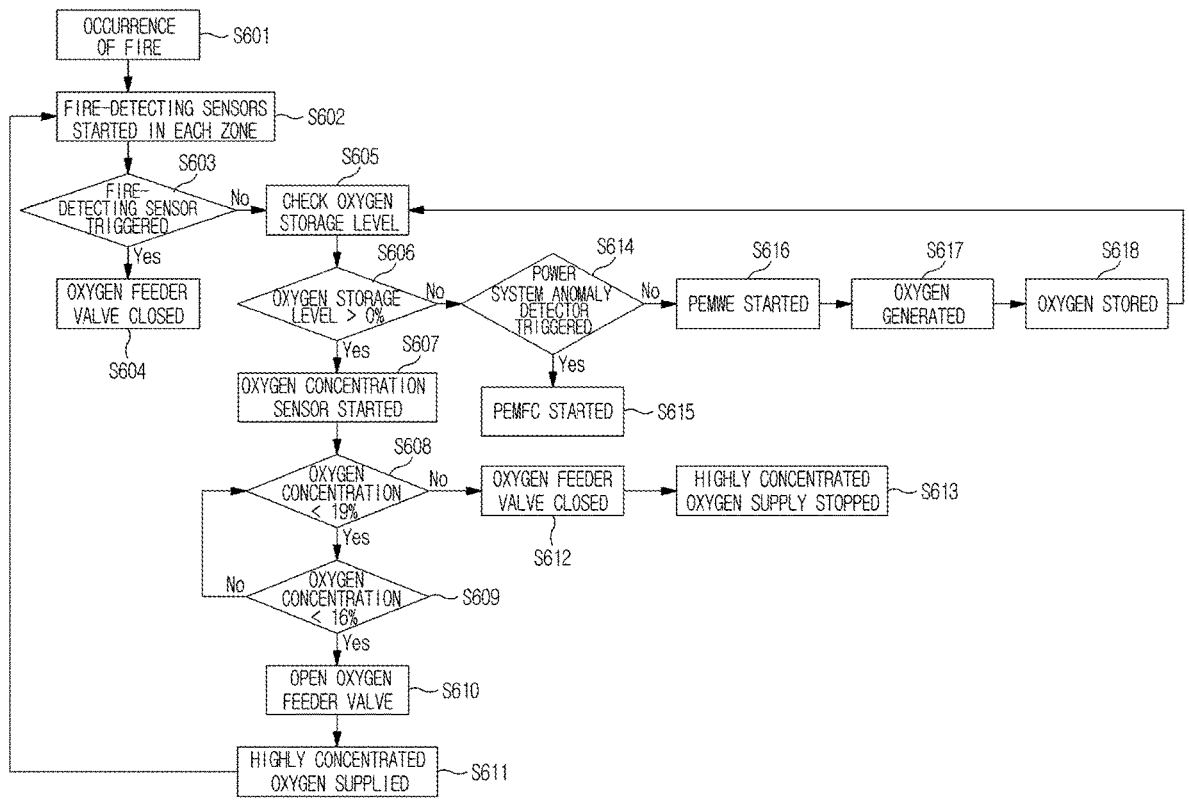
FIG. 6 is a flowchart illustrating examples of control depending on whether or not a fire has occurred in the method for controlling a unitized regenerative fuel cell system for tunnel according to one embodiment of the present disclosure.

FIG. 6 is a flowchart illustrating examples of control depending on whether or not a fire has occurred in the method for controlling a unitized regenerative fuel cell system for tunnel according to one embodiment of the present disclosure.

The example of FIG. 6 relates to an example wherein oxygen supply is controlled selectively to avoid asphyxiation in the event of a fire. As is the case in FIG. 3 above, the example of FIG. 6 is configured to start supply of highly concentrated oxygen when an oxygen concentration of 16% or less is detected in each zone, and to end oxygen supply if oxygen concentration reaches 19% or all of the stored oxygen is exhausted. Further, in the present example, whether or not an anomaly has occurred in a power system is detected, and when an anomaly does occur, control of the unitized regenerative fuel cell is carried out in parallel.

In a preferred embodiment of the present disclosure, fire-detecting sensors may be placed in each zone and [the system] may be controlled so that oxygen is supplied only in zones other than a zone where a fire has occurred.

Referring to FIG. 6, in the method for controlling a unitized regenerative fuel cell system for tunnel according to one embodiment of the present disclosure, when a fire occurs at S601, fire-detecting sensors in each zone may be operated at S602, and whether or not the fire-detecting sensors are triggered may be checked at S603 to identify the zone wherein a fire has occurred. Here, in a case where a fire has been detected in the tunnel, oxygen must be supplied by means of the oxygen feeders to the zones where the fire has not occurred, and the zones to which oxygen is to be supplied are determined depending on whether or not the fire-detecting sensors are triggered.

A zone where the fire-detecting sensor has been triggered is a zone where a fire has occurred, therefore the oxygen feeder valve is kept closed at S604. On the other hand, as a zone where the fire-detecting sensor has not been triggered is a zone unrelated to the occurrence of fire, supplying oxygen may be carried out selectively by determining whether or not to supply oxygen. Accordingly, the controller checks the amount of oxygen stored in an oxygen storage unit 140 at S605, and if the stored oxygen level is equal to or less than a preset level (for example, 0%) at S606, supplying oxygen is not carried out, as it is not possible to supply oxygen.

On the other hand, in a case where the stored oxygen level exceeds the preset level (for example, 0%), supplying oxygen is carried out, as supply of oxygen is now possible.

Whether or not to supply oxygen may be decided depending on the oxygen concentration of a given zone, and to this end an oxygen concentration sensor may be operated to measure oxygen concentration at S607. In cases where the measured oxygen concentration is less than an upper limit (for example, 19%) at S608 or less than a reference level (for example, 16%) at S609, the oxygen feeder valve may be opened at S610 to supply highly concentrated oxygen into the given zone at S611. This oxygen supply process may be continued so long as the oxygen concentration is less than the upper limit (19%), and preferably the process may be configured to return to S602 to determine whether or not the fire has spread, rendering it necessary to cut off oxygen supply, and check again whether or not the fire-detecting sensor has been triggered.

In a case where, in S608, the oxygen concentration exceeds an upper limit, there is already sufficient oxygen in the given zone, and determining that additional oxygen supply is unnecessary, the oxygen feeder valve may be closed at S612 to halt supply of highly concentrated oxygen at S613.

Meanwhile, in a case where, in S606, the level of oxygen stored in the oxygen storage unit is determined to be equal to or lower than a preset level, the controller may determine that supply of oxygen is not possible and carry out a series of steps to operate the unitized regenerative fuel cell in a water electrolysis mode.

Power system sensors detect anomalies in the power system at S614, and in a case where a power system anomaly has occurred, the unitized regenerative fuel cell operates the unitized regenerative fuel cell in fuel cell mode to begin emergency power generation at S615. In this case, oxygen may be supplied using outside air.

On the other hand, in a case where there is no power system anomaly, the unitized regenerative fuel cell may be operated in a water electrolysis mode at S616. In the water electrolysis mode, oxygen and hydrogen may be generated by the unitized regenerative fuel cell at S617, and the generated oxygen and hydrogen may be stored in respective storage units at S618. The oxygen storage level may be continually monitored, and whether or not the oxygen storage level exceeds a reference level may be continually checked.

Figure 7:
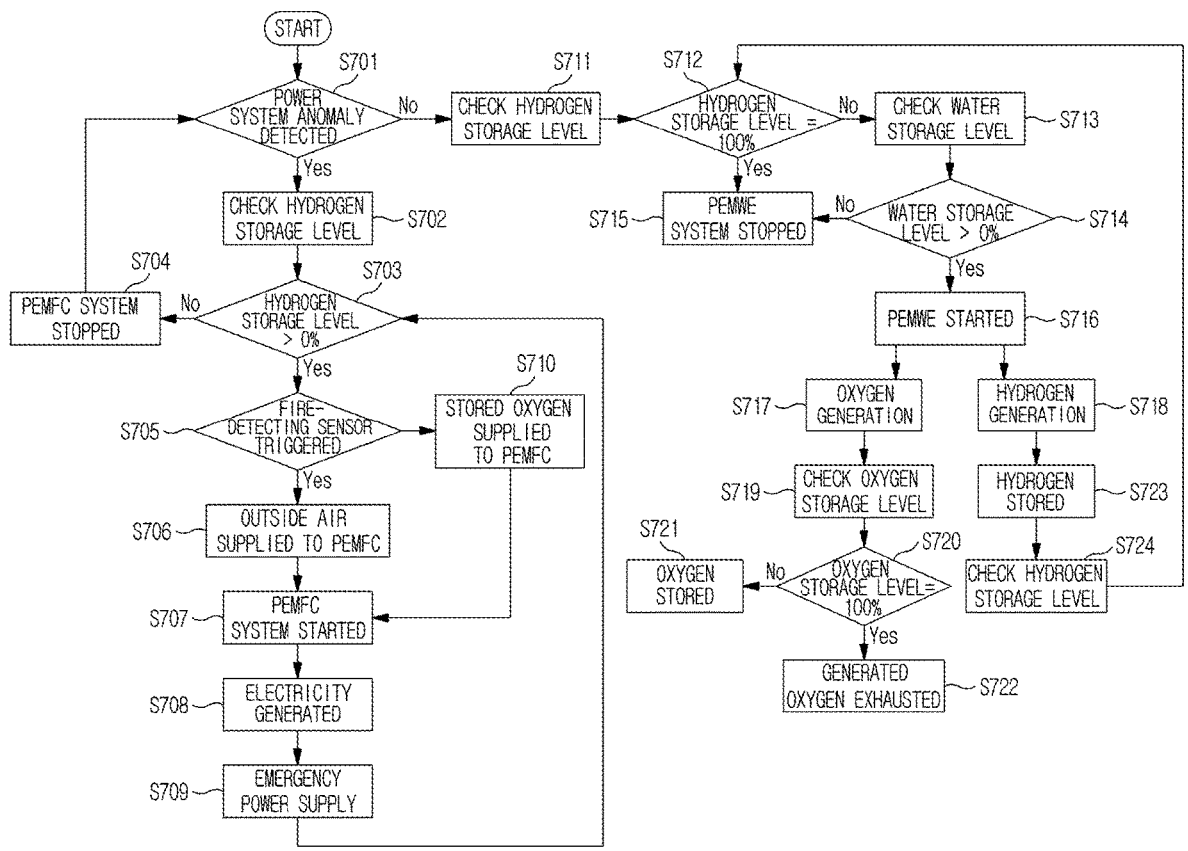
FIG. 7 is a flowchart illustrating an example of control in the method for controlling a unitized regenerative fuel cell system for tunnel according to one embodiment of the present disclosure wherein the system is controlled so that the water electrolysis system and the fuel cell system operate selectively.

FIG. 7 is a flowchart illustrating an example of control in the method for controlling a unitized regenerative fuel cell system for tunnel according to one embodiment of the present disclosure wherein the system is controlled so that the water electrolysis system and the fuel cell system operate selectively.

The example of FIG. 7 may be carried out regardless of whether or not a fire has occurred, but preferably may be carried out in a normal situation when no fire has occurred.

As illustrated in FIG. 7, a power system sensor may detect a power system anomaly at S701, and if a power system anomaly occurs, a series of steps S702 to S710 may be carried out to supply emergency electric power to electrically powered facilities in the tunnel. On the other hand, if it is found that there is no power system anomaly, a series of steps S711 to S724 relating to a water electrolysis mode of the unitized regenerative fuel cell may be carried out depending on the storage status of reaction byproducts in the system.

After detecting whether or not a power system anomaly has occurred at S701, if it is determined that a power system anomaly has occurred, the hydrogen storage level in the hydrogen storage unit is checked at S702, and if the stored hydrogen level is equal to or less than a preset level at S703, operation of the unitized regenerative fuel cell in fuel cell mode is stopped at S704. On the other hand, in a case where the hydrogen storage level exceeds the preset level at S703, it is determined that the unitized regenerative fuel cell can be operated in fuel cell mode.

Provided, that when operating in fuel cell mode, the oxygen source may be determined depending on whether or not a fire has occurred. That is, as in the foregoing examples, if a fire has occurred, it is necessary to supply oxygen into the tunnel, and therefore it is preferable that the stored oxygen is retained instead of being consumed.

Accordingly, according to a preferred embodiment of the present disclosure, whether or not a fire-detecting sensor has been triggered is detected at S705, and if a fire is detected outside air is supplied to the unitized regenerative fuel cell at S706, and the unitized regenerative fuel cell is operated in a fuel cell mode at S707. In fuel cell mode, the unitized regenerative fuel cell generates electric energy at S708, and the electric power generated is supplied as emergency power for electricity-powered facilities in the tunnel at S709. On the other hand, if a fire is not detected, the stored oxygen may be supplied to the unitized regenerative fuel cell at S710, and the unitized regenerative fuel cell may be operated in fuel cell mode at S707.

Meanwhile, in a case where a power system anomaly is not detected in S701, the hydrogen storage level in the hydrogen storage unit is checked at S711 to determine whether or not the hydrogen storage level is less than a maximum level at S712. If the hydrogen storage level is less than a maximum level, the water storage level in the system is checked at S713, and if the water storage level is equal to or less than a reference level (for example, 0%), it is determined that operation in water electrolysis mode is not possible, and operation of the unitized regenerative fuel cell in water electrolysis mode is stopped at S714. On the other hand, is the water storage level exceeds a reference level (for example, 0%), it is determined that operation in water electrolysis mode is possible, and the unitized regenerative fuel cell may be operated in water electrolysis mode at S716.

Accordingly, as the unitized regenerative fuel cell is operated in water electrolysis mode, hydrogen and oxygen are generated at S717, S718. As for the oxygen generated, the oxygen storage level is checked at S719, and the oxygen is stored in the oxygen storage unit until the oxygen storage level reaches the maximum level that can be accommodated in the oxygen storage tank (for example, 100% of storage capacity) at S721, and if the oxygen storage level reaches a maximum level at S720, the oxygen generated may be exhausted outwards at S722.

Further, the hydrogen generated may be stored in a hydrogen storage unit at S723, and the generated hydrogen may be stored in a hydrogen storage tank up to the maximum level that can be accommodated by the storage tank. Accordingly, after checking the hydrogen storage level in the hydrogen storage unit at S724, S712 can be returned to and the next control can be carried out depending on whether or not the maximum level has been reached.

Through these processes, it is possible to generate hydrogen and oxygen through operation in water electrolysis mode while the power system is operating normally, and when a power system anomaly is detected, emergency power generation in fuel cell mode can supply necessary electric power.

Whereas specific embodiments of the present disclosure have been illustrated and described, it shall be self-evident to a person having ordinary skill in the art that the present disclosure may be changed and modified in various ways without departing from the technical idea of the present disclosure as provided by the appended claims.

The invention claimed is:

1. A unitized regenerative fuel cell system for a tunnel, the unitized regenerative fuel cell system comprising:
a unitized regenerative fuel cell configured to operate in a fuel cell mode for electric power generation, and configured to operate in a water electrolysis mode for hydrogen and oxygen production;
an oxygen storage unit configured to store oxygen produced when the unitized regenerative fuel cell operates in the water electrolysis mode;
an oxygen feed line connected to the oxygen storage unit;
a plurality of oxygen feeders configured to supply, from the oxygen feed line, oxygen to a plurality of predetermined zones within the tunnel;
a plurality of feeder valves configured to cut off oxygen supply to the oxygen feeders; and;
a plurality of fire-detecting sensors configured to detect fire in each of the plurality of predetermined zones within the tunnel;
wherein the unitized regenerative fuel cell system is configured to, when a fire in the tunnel is detected by the plurality of fire-detecting sensors, open the plurality of feeder valves to supply oxygen to the plurality of predetermined zones within the tunnel where the fire has not occurred.

2. The unitized regenerative fuel cell system of claim 1, wherein the plurality of oxygen feeders are each designated for the plurality of predetermined zones within the tunnel assigned to the plurality of fire-detecting sensors, and the plurality of feeder valves for each of the plurality of oxygen feeders designated for the plurality of predetermined zones within the tunnel in which a fire has been detected is closed so that oxygen is not fed thereto.

3. The unitized regenerative fuel cell system of claim 1, where, when oxygen stored in the oxygen storage unit is at or below a preset reference level, the unitized regenerative fuel cell is operated in water electrolysis mode to produce oxygen.

4. The unitized regenerative fuel cell system of claim 1, comprising:
a plurality of oxygen concentration sensors installed for the plurality of predetermined zones within the tunnel preassigned to the plurality of oxygen feeders to measure the oxygen concentration of each zone;
wherein the oxygen concentration sensors are controlled to measure the oxygen concentration of each zone; and
wherein when the measured oxygen concentration is equal to or less than a reference concentration, the unitized regenerative fuel cell system opens a feeder valve to supply oxygen into sections within the tunnel where a fire has not occurred.

5. The unitized regenerative fuel cell system of claim 1, comprising:
a power supply for supplying electric power to the unitized regenerative fuel cell and electrically powered facilities within the tunnel; and,
a hydrogen storage unit for storing hydrogen produced by the unitized regenerative fuel cell;
wherein the unitized regenerative fuel cell is configured to operate in water electrolysis mode powered by electricity from the power supply; and
wherein when an anomaly of the power supply is detected, the unitized regenerative fuel cell receives hydrogen from the hydrogen storage unit to operate in fuel cell mode to provide emergency power to electrically powered facilities within the tunnel.

6. The unitized regenerative fuel cell system of claim 5, wherein the unitized regenerative fuel cell system is configured to check, when an anomaly of the power supply is detected, whether or not the plurality of fire-detecting sensors have detected a fire, and when a fire has not been detected by the fire-detecting sensors, the unitized regenerative fuel cell system supplies the oxygen stored in the oxygen storage unit to the unitized regenerative fuel cell, and, when a fire has been detected by the fire-detecting sensors, the unitized regenerative fuel cell system supplies outside air to the unitized regenerative fuel cell.

7. The unitized regenerative fuel cell system of claim 5, further comprising a water storage unit configured to store water to be supplied to the unitized regenerative fuel cell;
wherein the unitized regenerative fuel cell system is configured to check the amount of hydrogen stored in the hydrogen storage unit and the amount of water stored in the water storage unit when an anomaly of the power supply has not been detected; and
wherein when the amount of hydrogen stored is less than a maximum level and the amount of water stored exceeds a reference level, the unitized regenerative fuel cell system operates the unitized regenerative fuel cell in the water electrolysis mode to produce hydrogen and oxygen.

8. A method for controlling a unitized regenerative fuel cell system for a tunnel, the system comprising a unitized regenerative fuel cell configured to operate in a fuel cell mode for power generation and in a water electrolysis mode for hydrogen and oxygen production, a plurality of fire-detecting sensors configured to detect fire in zones of the tunnel, and, a plurality of oxygen feeders configured to supply oxygen to each of a plurality of predefined sections in the tunnel, configured to supply electric power generated in the fuel cell mode to electrically powered facilities in the tunnel, and able to store oxygen and hydrogen generated in the water electrolysis mode, the method comprising:
storing oxygen produced by the water electrolysis mode of the unitized regenerative fuel cell;
detecting a fire in a tunnel using the plurality of fire-detecting sensors; and
supplying stored oxygen to zones wherein a fire has not occurred by oxygen feeders when a fire has been detected in the tunnel.

9. The method of claim 8, wherein the plurality of oxygen feeders are assigned to zones in the tunnel assigned to the plurality of fire-detecting sensors, and wherein, in supplying oxygen, oxygen is supplied into the tunnel through the plurality of oxygen feeders assigned to the tunnel zones other than the zone in which fire has been detected, and oxygen supply from the oxygen feeders assigned for the zone of the tunnel where fire has been detected is blocked.

10. The method of claim 8, further comprising checking oxygen storage level in an oxygen storage unit prior to supplying oxygen when occurrence of a fire has been detected in detecting a fire, and wherein, when the oxygen stored in the oxygen storage unit is equal to or less than a preset reference level, the unitized regenerative fuel cell is operated in a water electrolysis mode to produce oxygen.

11. The method of claim 10, further comprising, after checking oxygen storage level and prior to supplying oxygen, measuring oxygen concentration in the plurality of predetermined zones within the tunnel using a plurality of oxygen concentration sensors installed in the plurality of predetermined zones within the tunnel assigned beforehand to the plurality of oxygen feeders, and wherein, in supplying oxygen, oxygen is supplied to zones wherein the measured oxygen concentration is less than a reference concentration.

12. A method for controlling a unitized regenerative fuel cell system for tunnel, the system comprising a unitized regenerative fuel cell configured to operate in a fuel cell mode for power generation and in a water electrolysis mode for hydrogen and oxygen production, a plurality of fire-detecting sensors configured to detect fire in zones of a tunnel, a plurality of oxygen feeders configured to supply oxygen to each of a plurality of predefined sections in the tunnel, and a power supply for supplying electric power to the unitized regenerative fuel cell and electrically powered facilities in the tunnel, the method comprising:

detecting, by a sensor, whether there is an anomaly in a supply of electric power from the power supply to the electrically-powered facilities in the tunnel; and supplying emergency power to the electrically powered facilities in the tunnel by operating the unitized regenerative fuel cell in a fuel cell mode when a power supply anomaly is detected.

13. The method of claim 12, further comprising:

before detecting whether there is an anomaly in supply of electric power, and before supplying emergency power, detecting occurrence of fire in the tunnel by the plurality of fire-detecting sensors, wherein when a fire is not detected by the plurality of fire-detecting sensors, oxygen stored in an oxygen storage unit is supplied to the unitized regenerative fuel cell, and wherein when a fire is detected by the plurality of fire-detecting sensors, outside air is supplied to the unitized regenerative fuel cell.

14. The method of claim 12, wherein the system further comprises a water storage unit for storing water to be supplied to the unitized regenerative fuel cell, and wherein the method further comprises checking a hydrogen storage level in a hydrogen storage unit and a water storage level in a water storage unit when no power supply anomaly has been detected in detecting whether or not there is an anomaly in supply of electric power; and generating hydrogen and oxygen by operating the unitized regenerative fuel cell in a case where the hydrogen storage level is less than a maximum level and the water storage level exceeds a reference level.

* * * * *